May 1, 1956
M. KILEMNIK
2,744,190
LIGHT DIFFUSING SCREENS FOR ELECTRIC DISCHARGE TUBES
Filed July 26, 1951
3 Sheets-Sheet 1
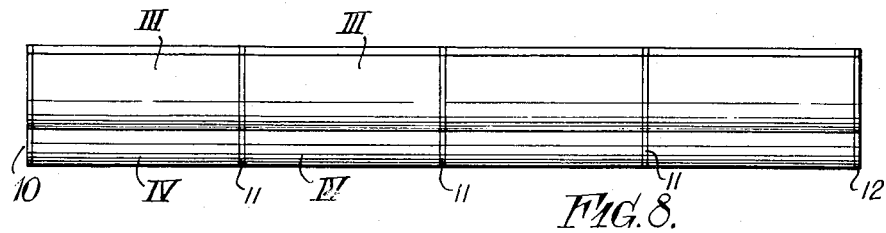
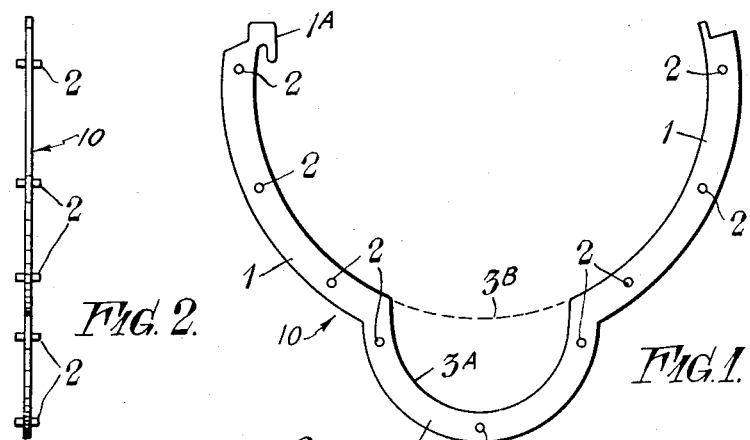
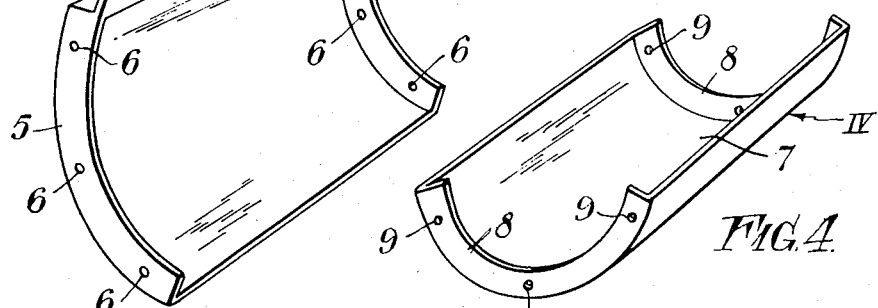
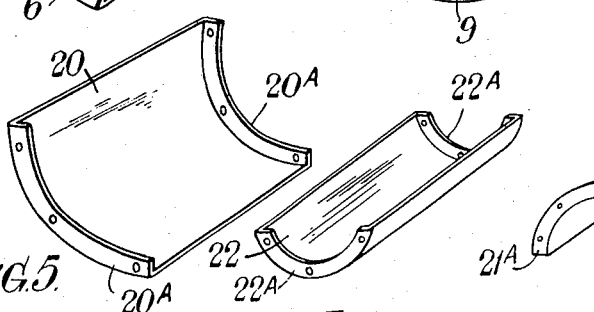
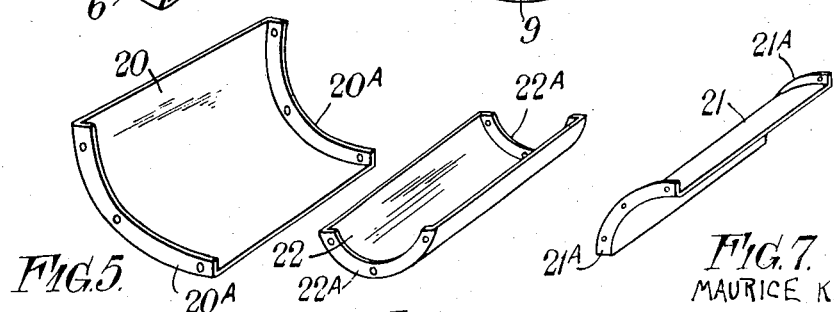
MAURICE KILEMNIK
INVENTOR
By Haseltine, Faker & Co.
AGENTS

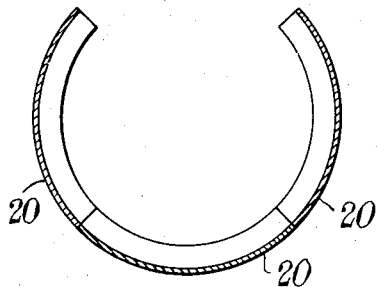
FIG. 9.
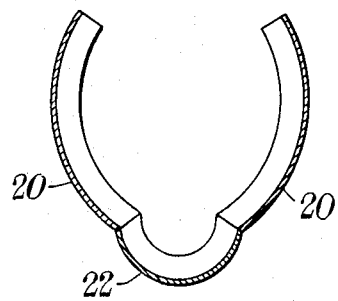
FIG. 10.
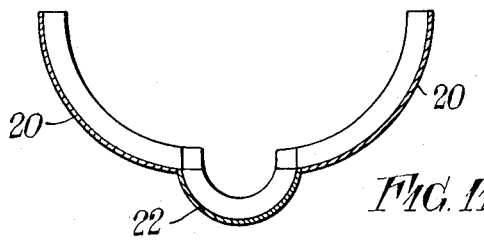
FIG. 11.
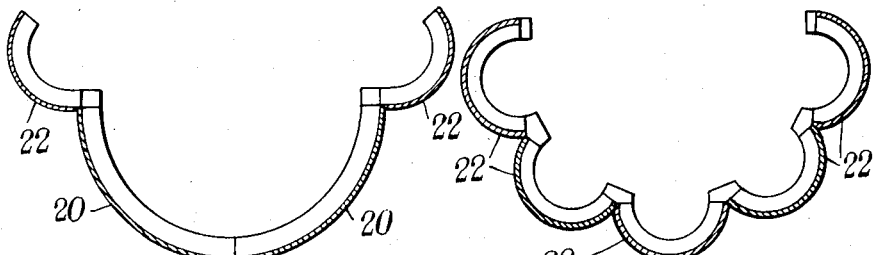
FIG. 12.
FIG. 13.
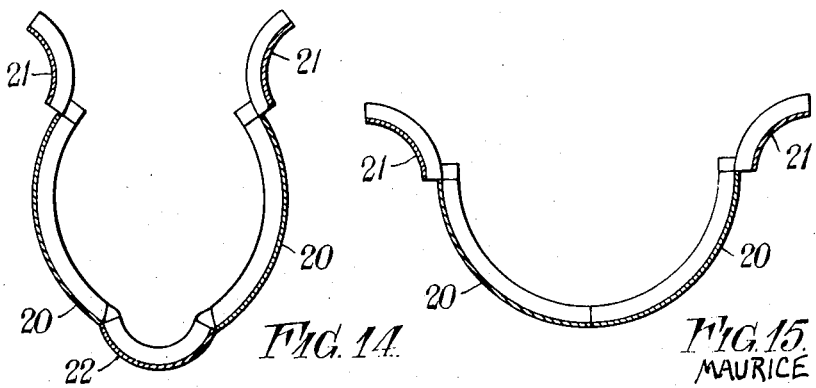
FIG. 14.
FIG. 15.
MAURICE KILEMNIK
INVENTOR
By Haseltine, Laker Co.
AGENTS

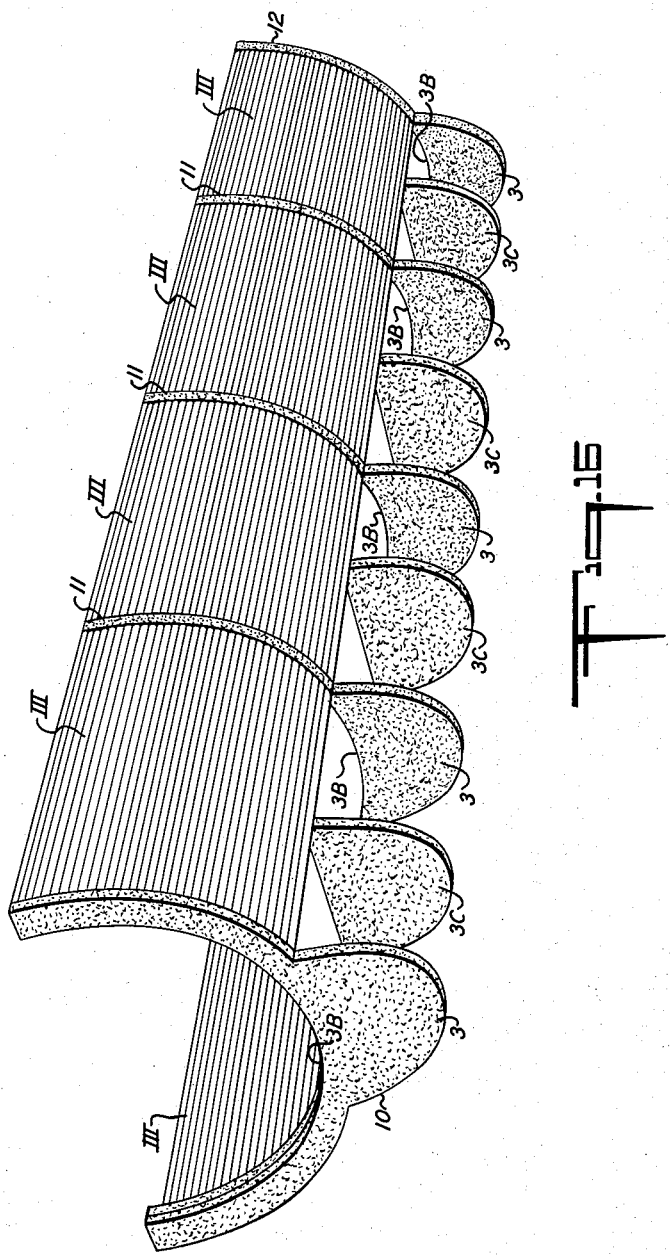

United States Patent Office 2,744,190
Patented May 1, 1956

2,744,190

LIGHT DIFFUSING SCREENS FOR ELECTRIC DISCHARGE TUBES

Maurice Kilemnik, Paris, France

Application July 26, 1951, Serial No. 238,610

Claims priority, application France August 2, 1950

5 Claims. (Cl. 240—51.11)

This invention relates to screens for use with a source or sources of illumination, and is concerned with screens applicable for use with electric discharge tubes.

In the use of electric discharge tubes as a source of illumination, it is well recognized that it is highly desirable to employ screens which serve to diffuse the light and reduce the dazzle otherwise caused by an unscreened tube.

It is an object of the invention to devise a simple construction of screen which will be effective in diffusing the light from the light source, whilst being readily applicable to light sources of various dimensions.

In accordance with the invention there is provided a screen comprising several spaced rib plates shaped in conformity with the desired cross-section of the screen, and wall elements secured between each pair of adjacent rib plates by attaching the ends of such wall elements to the rib plates, at least some of the wall elements being formed of translucent plastic material.

For a better understanding of the invention and to show how the same may be carried into effect reference will now be made to the accompanying drawings in which:

Figure 1 is a front view of a rib plate,

Figure 2 is a side view corresponding to Figure 1.

Figure 3 is a perspective view of a wall element,

Figures 4, 5, 6 and 7 are all views similar to Figure 3 of modified wall elements.

Figure 8 is a diagrammatic side view of a screen made up from some of the components shown in the figures previously referred to.

Figures 9 to 15 show sectional views of variously shaped screens that may be made.

Figure 16 is a perspective view of a further modification of the screen shown in Fig. 8.

Referring first to Figures 1 and 2, a rib plate is there shown, formed as a strip of material. The strip is symmetrically shaped with two curved side portions 1 joined by a curved central portion 3. Both portions 1 have a larger radius of curvature than that of the portion 3. Integral pegs 2 project from both faces of the rib plate, there being three such pegs on each face of each curved portion. The rib plate may be moulded from a synthetic plastic material such as polystyrene.

In Figure 3 there is shown a wall element consisting of an arcuate section shell 4 having end flanges 5 disposed perpendicularly thereto. The flanges 5 have apertures 6 for engagement with the pins 2 of either of the curved portions 1 of the rib plate. In Figure 4 a similar wall element is shown having a shell 7 with end flanges 8 and apertures 9. The latter are for engagement with the pins 2 in the curved portion 3 of the rib plate. Both the wall elements of Figures 3 and 4 are preferably moulded from a plastic material such as polystyrene.

A screen such as shown in Figure 8, can readily be formed with the wall elements of Figures 3 and 4 and a set of identical rib plates shaped as shown in Figure 1. The rib plates such as 10, 11 and 12 are disposed transversely to the length of the longitudinally extending screen that is to be built. The rib plates are spaced apart by a distance equal to the length of the wall elements. Elements III such as shown in Figure 8 are located between the facing curved portions 1 of two adjacent rib plates, whilst an element IV such as shown in Figure 4 is located between the portions 3. The pegs 2 on the rib plates are entered in the registering apertures 6 and 9 of the wall elements. The pegs are secured in the apertures by welding or by the use of an adhesive.

The screen of Figure 8 may be continued to any desired extent to obtain a longitudinally extending screen of desired dimensions. The rib plates and wall members, being made from a transparent material such as moulded polystyrene, cause relatively small light losses. The interior or exterior surfaces (or both) of the wall elements are formed with grooves or other irregularities to produce diffusion of the light transmitted therethrough. To facilitate the support of the screen the rib-plates may be formed with integral hook-like ends, as indicated at 1A in Figure 1.

The wall elements of the screen indicated in Figure 8 form a trough-like enclosure for electric discharge tubes located therein. Under certain circumstances it may be desirable to omit the wall elements IV, so that the trough-like screen is open at its lower side as shown in Figure 16. The rib plates, will of course, extend across the lower opening, and the curved portion 3 of each rib plate may be shaped so that the inner boundary 3A (see Figure 1) is raised to 3B. Thus the finished screen will appear to have a number of transverse segmental louvres disposed across the lower opening in the trough. Extra segmental pieces 3C can be attached as between the lower facing edges 3 of the wall elements III to increase the louvre effect obtained by the lower portions of the rib plates. Both the extra segmental pieces 3C and the free segmental portions 3 of the rib plates may be rendered non-transparent by the formation of light-diffusing surface irregularities.

In Figure 5 there is shown a wall element comprising a shell 20 with end flanges 20A disposed on the inside of the curve of the shell. In Figure 7 a similar wall element is shown having a shell 21 with, however, the end flanges 21A disposed on the outside of the curve of the shell. Both the wall elements of Figures 5 and 7 are of arcuate section subtending about 90° to the central axis. In Figure 6 a wall element is shown having a shell 22 and flanges 22A, this wall element resembling that of Figure 5 but subtending a much greater angle.

Transverse sections of various screens are shown in Figures 9 to 15, all the screens having been constructed, by choosing various shapes for the rib plates of different sets, and employing the wall elements of Figures 5, 6 and 7. In Figures 9 to 15 the rib plates lie beneath the imposed wall sections identified by the reference numerals as employed in Figures 5 to 7. The illustrated wide variety of screens obtainable with the standard wall sections and differing sets of rib plates, does not, of course, exhaust all the possibilities of construction. It is to be noted that the variation of the rib plates to obtain sets of different shapes affords a highly economical way of constructing a vast range of screens from standard wall sections.

I claim:

1. A frameless screen of longitudinally extending trough-like form, comprising a former arrangement consisting of at least three similarly shaped, spaced transverse rib plates each generally shaped in conformity with a chosen transverse cross-section for the screen and each including at least two profile portions of predetermined shape, a plurality of longitudinally extending wall elements located between each pair of adjacent rib plates, each wall element being of a transverse cross-section conforming to said predetermined shape of a related profile portion of said rib plates, and at least some of said wall elements being formed of light-transmitting plastic material, and means for positively attaching the ends of said wall elements to said rib plates at the related profile portions of the latter where they conform to the transverse cross-section of said wall elements, whereby each rib plate serves as the sole relatively rigid connection between the wall elements at the opposite sides thereof and the assembly of rib plates and wall elements alone affords a longitudinally extending substantially rigid screen of chosen cross-section.

2. A screen according to claim 1 in which said rib plates consist of light-transmitting plastic material.

3. A screen according to claim 1, and in which the wall elements secured between each pair of adjacent rib plates are disposed on opposite sides of and spaced from a longitudinal line through the screen, whereby a longitudinal gap is created between said wall elements in the screen, the gap being traversed by said rib plates.

4. A frameless screen of longitudinally extending trough-like form, comprising a former arrangement consisting of at least three similarly shaped, spaced, transverse rib plates, each extending in a plane transverse to the length of the screen and each being peripherally shaped generally in accordance with a chosen transverse cross-sectional external shape for the trough-like screen and each including profile portions on the periphery thereof of predetermined shape, a plurality of longitudinally extending wall elements located between each pair of adjacent rib plates, at least some of said wall elements being formed of light-transmitting plastic material and each of said wall elements being of a transverse section conforming to the shape of a related one of said profile portions of said rib plates, and means for directly securing the ends of said wall elements to said rib plates at locations on the periphery of the latter where the related profile portion of predetermined shape conforms with the cross-section of the wall element, whereby each rib plate serves as the sole relatively rigid connection between the wall elements at the opposite sides thereof and a self-supporting structure is formed from said rib plates and wall elements alone.

5. A frameless screen of longitudinally extending trough-like form, comprising a former arrangement consisting of at least three spaced transverse rib plates formed of strip-like material lying in planes transverse to the length of the screen, and each such rib plate generally extending along a line defining the chosen cross-section for the trough-like screen and including peripheral portions of predetermined shape, a plurality of longitudinally extending wall elements located between each pair of adjacent rib plates, at least some of said wall elements being formed of light-transmitting plastic material, and each of said wall elements being of transverse cross-section corresponding to the predetermined shape of a related one of said peripheral portions, integral flanges at each end of said wall elements and extending inwardly of the trough-like screen in planes transverse to the length of the screen to abut facially against the adjacent rib plates, and means carried by said rib plates and extending through said flanges in directions parallel to the length of the screen for connecting said flanges to said rib plates at the related profile portions of the latter corresponding to the transverse cross-section of the wall element, whereby said rib plates serve as the sole relatively rigid connection between the wall elements at the opposite sides thereof and a self-supporting screen is formed from said rib plates and wall elements alone.

References Cited in the file of this patent

UNITED STATES PATENTS

| | | |
|---|---|---|
| 2,259,151 | Claspy | Oct. 14, 1941 |
| 2,259,152 | Claspy | Oct. 14, 1941 |
| 2,277,433 | Guth | Mar. 24, 1942 |
| 2,291,488 | Naysmith | July 28, 1942 |
| 2,338,077 | Scribner | Dec. 28, 1943 |
| 2,526,828 | Phillips | Oct. 24, 1950 |
| 2,559,641 | Kruger | July 10, 1951 |